United States Patent
DeCusatis

(10) Patent No.: US 7,689,077 B1
(45) Date of Patent: Mar. 30, 2010

(54) LOW DIFFERENTIAL DELAY CHROMATIC DISPERSION COMPENSATOR

(75) Inventor: Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/266,708

(22) Filed: Nov. 7, 2008

(51) Int. Cl.
*G02B 6/26* (2006.01)
*G02B 6/34* (2006.01)
*G02B 6/42* (2006.01)

(52) U.S. Cl. .............................. 385/37; 385/15; 385/31

(58) Field of Classification Search .................. 385/15, 385/31, 37
See application file for complete search history.

(56) References Cited

U.S. PATENT DOCUMENTS

| 5,602,949 | A | 2/1997 | Epworth |
| 6,055,081 | A | 4/2000 | Koyano et al. |
| 6,356,684 | B1 | 3/2002 | Patterson et al. |
| 6,590,684 | B1 * | 7/2003 | Goodfellow ................ 398/149 |
| 2002/0197028 | A1 * | 12/2002 | Suzuki et al. ................. 385/96 |
| 2004/0017972 | A1 | 1/2004 | Lelievre et al. |
| 2004/0101239 | A1 | 5/2004 | Parker |
| 2004/0101241 | A1 | 5/2004 | Kohnke et al. |
| 2004/0161197 | A1 * | 8/2004 | Pelletier et al. ............... 385/37 |
| 2004/0208649 | A1 * | 10/2004 | Matthews et al. ........... 398/195 |
| 2005/0220399 | A1 * | 10/2005 | Alberti et al. ................. 385/27 |

OTHER PUBLICATIONS

Kashyap et al., "1.3m long super-step-chirped fibre Bragg grating with a continuous delay of 13.5ns and bandwidth 10n, for broadband dispersion compensation," Sep. 12, 1996, Electronics Letters, vol. 32, No. 19, pp. 1807-1809.*

U.S. Appl. No. 12/266,698, filed Nov. 7, 2008.

Benjamin J. Eggleton, et al., Electrically Tunable Power Efficient Dispersion Compensating Fiber Bragg Grating, IEEE Photonics Technology Letters, vol. 11, No. 7, Jul. 1999, 3 pages.

B.J. Eggleton, et al., Integrated Tuable Fiber Gratings for Dispersion Management in High-Bit Rate Systems, Journal of Lightwave Technology, vol. 18, No. 10, Oct. 2000, 15 pages.

N.Q. Ngo, et al., Electrically Tunable Dispersion Compensator With Fixed Center Wavelength Using Fiber Bragg Grating, Journal of Lightwave Technology, vol. 21, No. 6, Jun. 2003, 8 pages.

Pavel Ivanoff Reyes, et al., 160-Gb/s Tunable Dispersion Slope Compensator Using a Chirped Fiber Bragg Grating and a Quadratic Heater, IEEE Photonics Technology Letters, vol. 17, No. 4, Apr. 2005, 3 pages.

S.S. Lee, et al., Continuous photonic microwave true-time delay using tapered chirped fibre Bragg grating, Electronics Letters 9th Jun. 2005, vol. 41, No. 12, 2 pages.

(Continued)

*Primary Examiner*—Frank G Font
*Assistant Examiner*—Jerry Blevins
(74) *Attorney, Agent, or Firm*—Cantor Colburn LLP; Joseph Biela

(57) ABSTRACT

A chromatic dispersion compensator with low differential delay is provided that includes a chirped fiber Bragg grating in a compensating optical fiber core. The chirped fiber Bragg grating includes wavelength gratings spaced at distances varying with respect to the length of the compensating optical fiber core to compensate for differential delay in a synchronous time protocol for a bidirectional computer data communication link. The chromatic dispersion compensator also includes an optical junction to optically couple the chirped fiber Bragg grating to an optical fiber of the bidirectional computer data communication link.

16 Claims, 3 Drawing Sheets

OTHER PUBLICATIONS

Jaejoong Kwon, et al., Tunable Dispersion Slope Compensator Using a Chirped Fiber Bragg Grating Tuned by a Fan-Shaped Thin Metallic Heat Channel, IEEE Photonics Technology Letters, vol. 18, No. 1, Jan. 1, 2006, 3 pages.

* cited by examiner

LOW DIFFERENTIAL DELAY CHROMATIC DISPERSION COMPENSATOR

BACKGROUND

The present invention relates to communication networks, and more specifically, to providing a low differential delay chromatic dispersion compensator for latency-sensitive networks.

In optical communication systems, chromatic dispersion of light signals propagating over long distances causes light pulses to spread out as they travel along an optical fiber. Chromatic dispersion occurs because different spectral components at different wavelengths in a pulse travel at slightly different speeds. For example, in normal dispersion situations, short wavelengths (blue) travel faster than long wavelengths (red). First-order chromatic dispersion, D, is given in ps/nm-km by the expression:

$$D = \frac{S_0}{4}\left(\lambda_c - \frac{\lambda_0^4}{\lambda_c^3}\right)$$

In this expression, $\lambda_0$ is the fiber's zero dispersion wavelength, $S_0$ is the fiber's zero dispersion slope, and $\lambda_c$ is the operating center wavelength. The resulting pulse spread can cause pulses in succession to overlap and interfere with each other, producing bit errors. The optical power penalty associated with first order dispersion, $P_d$, is given (in dB) by:

$$P_d = 5\log(1+2\pi(BD\alpha\lambda)^2L^2)$$

In this expression, B is the bit rate, L is the link length, and $\Delta\lambda$ is the root mean square (RMS) spectral width of the source. Dispersion can become a limiting factor in optical communication systems, since it grows worse for longer links and higher bit rates.

SUMMARY

According to one embodiment of the present invention, a chromatic dispersion compensator with low differential delay is provided that includes a chirped fiber Bragg grating in a compensating optical fiber core. The chirped fiber Bragg grating includes wavelength gratings spaced at distances varying with respect to the length of the compensating optical fiber core to compensate for differential delay in a synchronous time protocol for a bidirectional computer data communication link. The chromatic dispersion compensator also includes an optical junction to optically couple the chirped fiber Bragg grating to an optical fiber of the bidirectional computer data communication link.

An additional embodiment is a system that includes an optical fiber in a bidirectional computer data communication link to support optical communication between servers. The system also includes a chromatic dispersion compensator coupled to the optical fiber. The chromatic dispersion compensator has a low differential delay and includes a chirped fiber Bragg grating in a compensating optical fiber core. The chirped fiber Bragg grating includes wavelength gratings spaced at distances varying with respect to the length of the compensating optical fiber core to compensate for differential delay in a synchronous time protocol for a bidirectional computer data communication link. The chromatic dispersion compensator also includes an optical junction optically coupling the chirped fiber Bragg grating to the optical fiber in the bidirectional computer data communication link.

A further embodiment is a method of providing chromatic dispersion compensation with a low differential delay. The method includes linking at least two servers via a bidirectional computer data communication link comprised of optical fibers. The method additionally includes coupling a chromatic dispersion compensator with low differential delay to one of the optical fibers of the bidirectional computer data communication link. The chromatic dispersion compensator includes a compensating optical fiber core with a chirped fiber Bragg grating spaced at distances varying with respect to the length of the compensating optical fiber core to compensate for differential delay in a synchronous time protocol for the bidirectional computer data communication link. The chromatic dispersion compensator also includes an optical junction to optically couple the chirped fiber Bragg grating to the optical fiber of the bidirectional computer data communication link. The method further includes reducing chromatic dispersion of an optical pulse received at the chromatic dispersion compensator from the bidirectional computer data communication link via reflecting longer wavelengths of the optical pulse through an optically shorter path of the chirped fiber Bragg grating and reflecting shorter wavelengths of the optical pulse through an optically longer path of the chirped fiber Bragg grating.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
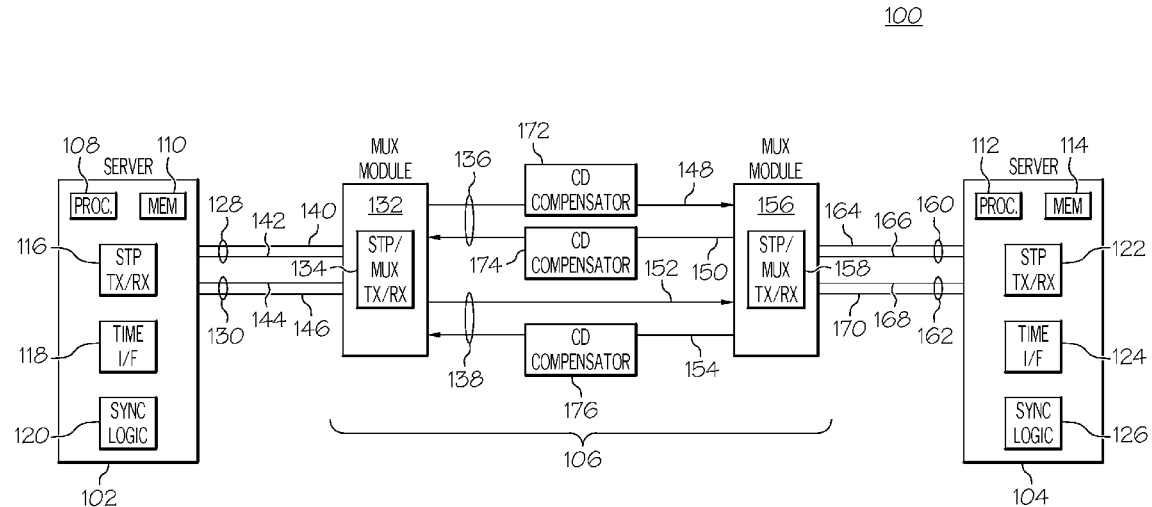
FIG. 1 depicts a block diagram illustrating a system that may be utilized to implement exemplary embodiments of the present invention.

The invention as described herein provides a low differential delay chromatic dispersion compensator for latency-sensitive networks. Differential time sensitive protocols (e.g., a synchronous time protocol) may be used in high-reliability computer systems, where servers operate synchronously for synchronous disaster recovery and business continuity applications. One example of such as protocol is Server Time Protocol (STP). STP is a synchronous time protocol that embeds time stamps within data streams, allowing multiple servers to synchronize themselves to a common time-of-day clock. Latency compensation for bidirectional links may be used to maintain a common time base with a high degree of accuracy between the servers. A bidirectional link between two servers can include separate fibers for transmission in each direction to and from the servers. If the length of the fibers in each direction of the bidirectional link varies substantially, e.g., over 900 meters, the resulting latency variation in each direction can cause synchronization errors, since it takes a greater amount of time to transmit in one direction versus the opposite direction.

STP may be transported on optical fibers using a multiplexing technique that merges multiple wavelengths and/or frequencies to increase throughput. An example of such a multiplexing technique is wavelength division multiplexing (WDM). WDM switches multiple optical carrier signals on an optical fiber by using different wavelengths of laser light to carry different signals. In a WDM system, pulses at different wavelengths typically suffer different amounts of dispersion. Another example of a multiplexing technique that can be used to increase the throughput of STP is time division multiplexing (TDM). TDM can multiplex several lower data rate signals onto a higher aggregate data rate carrier (e.g., 10 Gbit/s, 40 Gbit/s, or 100 Gbit/s), where higher data rates are more susceptible chromatic dispersion errors.

As the data rate and distance for STP links increases, for example, over 100 km, chromatic dispersion compensation may be performed. One approach to dispersion compensation is insertion of dispersion compensating fiber (DCF) in the communication path, where the DCF has an opposite and much stronger dispersion characteristic than normal fiber. This approach for dispersion compensation requires adjusting the length of the DCF to balance out the normal link dispersion. However, latency-sensitive protocols, such as STP, may demand that transmit and receive fibers in a link experience roughly the same differential time delay; otherwise, the time-of-day clocks can lose synchronization. Adding an arbitrary amount of DCF to one or more fibers in the link can result in a sufficiently large differential latency that prevents latency-sensitive protocols from functioning properly. This can limit the maximum distance of links between the servers, for instance, less than 100 km. Since dispersion depends on the fiber's physical properties as well as transmission laser characteristics, both fibers in a bidirectional link (assuming one fiber in each transmission direction) may experience different amounts of dispersion even if they follow the same physical path. After some DCF is added to one fiber in the bidirectional link, the fibers in the bidirectional link can be of significantly different physical lengths, e.g., one kilometer or more difference.

In an exemplary embodiment, a low differential delay chromatic dispersion compensator (also referred to simply as a "compensator" herein) with a chirped fiber Bragg grating is inserted in the communication path (bidirectional link) between servers. The additional path length of the compensator is minimal, (e.g., 3 meters or less) to minimize latency differences between compensated and uncompensated links. The chirped fiber Bragg grating recompresses optical signals that have spread due to chromatic dispersion, which enables higher throughput and/or longer distances between servers. Adding the compensator to fiber in only one direction of a bidirectional link has a near-zero differential latency impact, as the additional path length attributable to the compensator is negligible. Thus, the compensator provides low differential delay chromatic dispersion compensation relative to each direction of a bidirectional link. Moreover, while DCF typically uses a reduced diameter core as part of its compensation (which results in a transmission loss), the chirped fiber Bragg grating of the compensator can be embedded in an optical fiber core with a core diameter that is approximately the same as the link it compensates, resulting in a minimal transmission loss. The low differential delay chromatic dispersion compensator with chirped fiber Bragg grating is described in greater detail herein.

Turning now to the drawings, it will be seen that in FIG. 1 there is a block diagram of a system 100 upon which low differential delay chromatic dispersion compensation for latency-sensitive networks is implemented in exemplary embodiments. The system 100 of FIG. 1 includes a first server 102 in communication with a second server 104 over a network 106. The system 100 may be a systems complex (sysplex), where the servers 102 and 104 execute synchronously to each other under normal operating conditions. In an exemplary embodiment, the server 102 includes at least one processing circuit 108 (e.g., a CPU) capable of reading and executing instructions, as well as accessing memory 110. The processing circuit 108 may be a general purpose or application specific microprocessor, and/or can include multiple processing cores, e.g., a multi-core module (MCM). The memory 110 can be a combination of volatile and non-volatile memory, including cache and/or secondary storage, for program and/or data storage. Similarly, the server 104 includes at least one processing circuit 112 and memory 114, that may be the same technologies as described in reference to processing circuit 108 and memory 110.

The server 102 may include STP transmit and receive logic (TX/RX) 116 to transmit and receive data streams on the network 106 using a latency sensitive protocol. Time interface 118 accesses a time base, such as a time-of-day clock, that may be internal or external to the server 102, providing time information to sync logic 120. The sync logic 120 maintains synchronization between the servers 102 and 104, and can synchronize the server 102 to other servers (not depicted) of the system 100. Similarly, the server 104 includes STP TX/RX 122, time interface 124, and sync logic 126 to provide substantially the same functionality as the STP TX/RX 116, time interface 118, and sync logic 120 of server 102.

The server 102 may communicate through multiple links 128 and 130 to a multiplexing (mux) module 132. The mux module 132 includes STP to/from mux conversion transmit and receive logic (STP/MUX TX/RX) 134 to convert STP data into a multiplexed format for long distance communications, e.g., over 40 km. The mux module 132 optically encodes and decodes data on one or more bidirectional fiber optic links, such as links 136 and 138, also referred to as bidirectional computer data communication links 136 and 138. In one embodiment, links 128 and 130 are also bidirectional fiber optic links. In an alternate embodiment, links 128 and 130 are wired or wireless electronic communication paths. The links 128 and 130 may be comprised of unidirectional links 140, 142, 144, and 146, providing communication paths to and from the server 102 and mux module 132. In an exemplary embodiment, the bidirectional computer data communication links 136 and 138 include optical fiber links 148, 150, 152, and 154 (or simply "optical fibers"), providing a communication path between mux module 132 and mux module 156. Similar to the mux module 132, the mux module 156 includes STP/MUX TX/RX 158 to convert multiplexed data from the bidirectional computer data communication links 136 and 138 to STP for the server 104, as well as conversion in the opposite direction. The mux module 156 and server 104 can communicate via bidirectional links 160 and 162, which may be further comprised of unidirectional links 164, 166, 168, and 170. The bidirectional links 160 and 162 may be similar to the bidirectional links 128 and 130.

To maintain integrity of communications over the bidirectional computer data communication links 136 and 138, chromatic dispersion compensators can be added. In the example depicted in FIG. 1, chromatic dispersion compensator 172 is on link 148, chromatic dispersion compensator 174 is on link 150, and chromatic dispersion compensator 176 is on link 154; however, chromatic dispersion compensation is not used on link 152. The chromatic dispersion compensators 172-176 provide near-zero latency chromatic dispersion compensation for the bidirectional computer data communication links 136 and 138. In an exemplary embodiment the chromatic dispersion compensators 172-176 use passive optics to perform chromatic dispersion compensation.

Although FIG. 1 depicts two servers 102 and 104 in communication via a combination of links 128, 130, 136, 138, 160, and 162 through mux modules 132 and 156, the scope of the invention is not so limited. It will be understood that any number of links can be used to maintain low-latency differential communication between two or more servers with optical fibers. Moreover, the mux modules 132 and 156 can be incorporated in the servers 102 and 104. The mux modules 132 and 156 can use a variety or combination of multiplexing techniques to transport time synchronous protocol data with multiple wavelengths and/or frequencies via bidirectional computer data communication links 136 and 138. Examples of multiplexing techniques include wave division multiplexing (WDM) and time division multiplexing (TDM).

Figure 2:
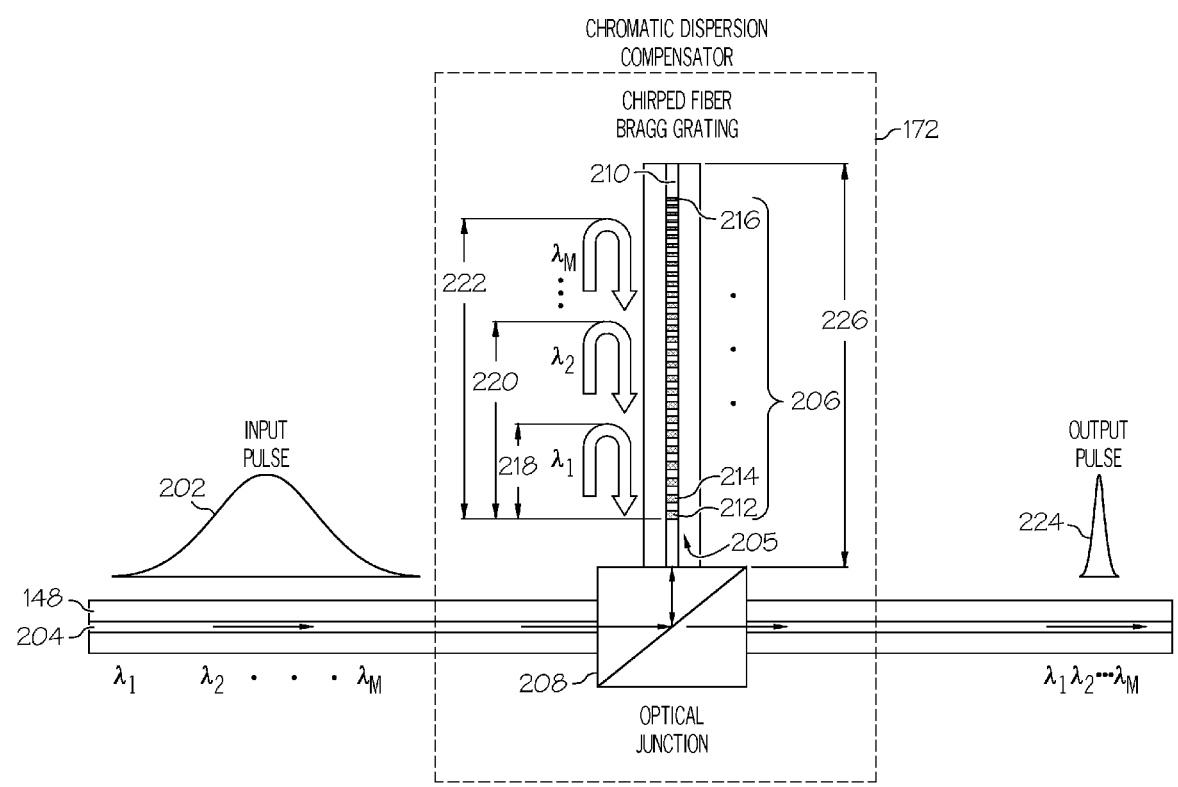
FIG. 2 depicts an example of a low differential delay chromatic dispersion compensator in accordance with exemplary embodiments.

FIG. 2 depicts an example of chromatic dispersion compensator 172 of FIG. 1 in accordance with exemplary embodiments. The chromatic dispersion compensator 172 provides low differential delay compensation on link 148 relative to link 150 of FIG. 1. An example of an input pulse 202 in link 148 is depicted prior to reaching the chromatic dispersion compensator 172. The input pulse 202 is comprised of multiple wavelengths ($\lambda_1, \lambda_2, \ldots, \lambda_M$) that become spread or broadened as it propagates in optical fiber core 204 of the link 148. Shorter wavelengths ($\lambda_M$) travel faster than longer wavelengths, such as $\lambda_2$ and $\lambda_1$, resulting in further spreading over greater distances. Rather than using DCF, which could add one or more kilometers to the path length of link 148, the chromatic dispersion compensator 172 performs first order chromatic dispersion compensation using a chirped fiber Bragg grating 206 in a compensating optical fiber 205. The chirped fiber Bragg grating 206 receives the input pulse 202 traveling through the link 148 using optical junction 208. The optical junction 208 may be an optical splitter, tap, or circulator.

The chirped fiber Bragg grating 206 can be manufactured by selectively doping compensating optical fiber core 210 of the compensating optical fiber 205 to make it sensitive to ultraviolet light, then exposing the compensating optical fiber core 210 using a phase mask in a manner similar to conventional lithography. A pattern of alternating high and low refractive index is written into the compensating optical fiber core 210, which acts as a diffraction grating. Light propagating through the chirped fiber Bragg grating 206 is scattered by Fresnel reflection from each successive refractive index perturbation (refractive index perturbation 212, refractive index perturbation 214, up to refractive index perturbation 216), in the compensating optical fiber core 210. A periodic index perturbation with period P causes high reflectivity in the vicinity of the Bragg wavelength, defined as $\lambda_B = 2\,nP$, where n is the effective modal index of the compensating optical fiber core 210. The light efficiency can approach 100% within a narrow wavelength window (1 nm or less) around the Bragg wavelength. The grating period can be made to vary linearly with distance in the compensating optical fiber core 210 to produce a chirped distribution of refractive index perturbations 212, 214 . . . 216 (also referred to as wavelength gratings 212, 214 . . . 216). As light with different wavelengths ($\lambda_1, \lambda_2, \ldots, \lambda_M$) passes through the chirped fiber Bragg grating 206, each refractive index perturbation 212, 214 . . . 216, reflects a limited range of wavelengths while allowing the rest to pass through.

The chirped fiber Bragg grating 206 enables longer wavelengths to reflect earlier, while shorter wavelengths are reflected later, as the input pulse 202 travels in and reflects out of the chirped fiber Bragg grating 206. Thus, faster wavelengths experience a longer path length, while the slower wavelengths experience a shorter path length. For example, $\lambda_1$ travels an optically shorter path 218 in the chirped fiber Bragg grating 206 before reflecting as compared to optically longer paths 220 and 222 reflecting $\lambda_2$ and $\lambda_M$ in the chirped fiber Bragg grating 206 of the compensating optical fiber core 210. The net effect recompresses the spectrum of the input pulse 202 to the output pulse 224, which travels through the optical junction 208 back to the link 148. Even if two separate chromatic dispersion compensators (e.g., chromatic dispersion compensators 172 and 174) are used on the same bidirectional link (e.g., bidirectional computer data communication link 136), the differential delay is nearly zero (approximately 15 nanoseconds or less) and is much lower than DCF solutions.

In an exemplary embodiment, the chromatic dispersion compensator 172 is optically passive, resulting in a low cost, simple compensator. The length 226 of the compensating optical fiber core 210 may be approximately 3 meters of less, adding very little distance to the total optical path length between servers 102 and 104 of FIG. 1, which can be over 100 km. Conventional DCF achieves its properties, in part, by reducing the diameter of the fiber core, which in turn increases the fiber's transmission loss. For example, commercial DCFs for 100 km standard single mode fiber have about 10 dB excess loss compared with conventional fibers. To minimize optical power losses attributable to the chromatic dispersion compensator 172, the diameter of the compensating optical fiber core 210 is equivalent to the optical fiber core 204 of the link 148 within a manufacturing tolerance. Reducing optical power losses due to compensation can extend the maximum distance at which the servers 102 and 104 can sustain high-speed time synchronous communications.

Figure 3:
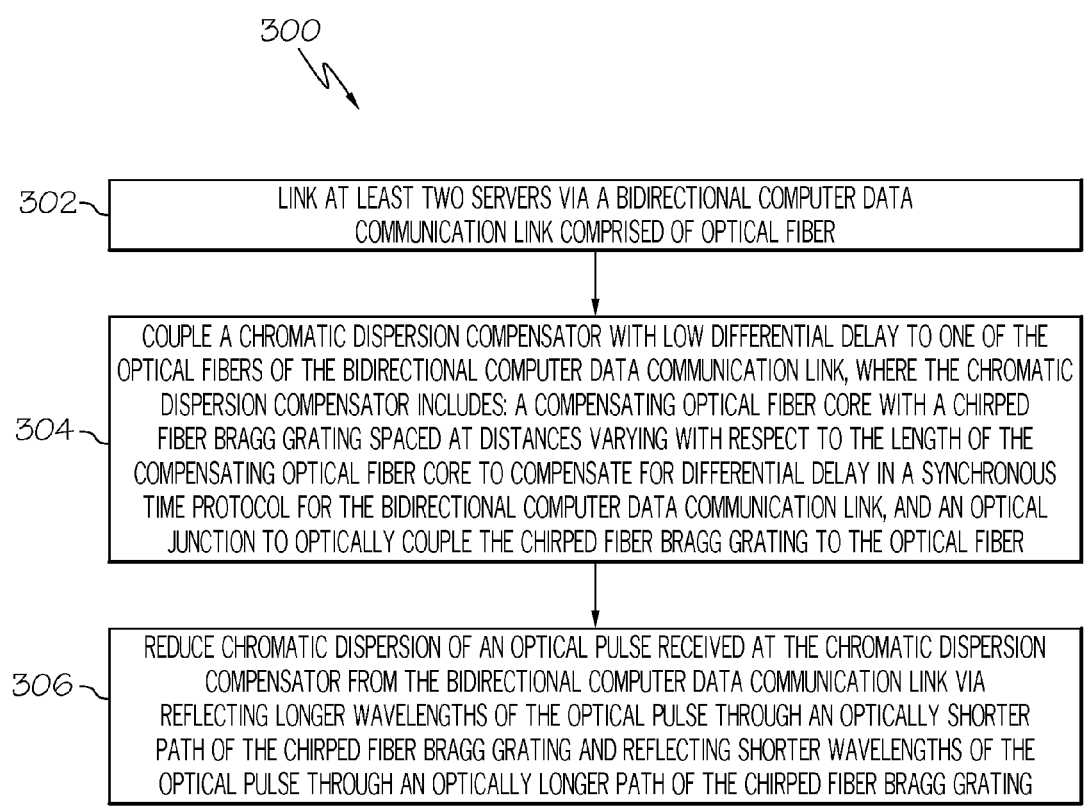
FIG. 3 depicts an exemplary process for low differential delay chromatic dispersion compensation.

Turning now to FIG. 3, a process 300 for low differential delay chromatic dispersion compensation will now be described in accordance with exemplary embodiments, and in reference to FIGS. 1 and 2. At block 302, at least two servers 102 and 104 are linked via bidirectional computer data communication link 136 that includes optical fiber links 148 and 150 supporting communication in opposite directions. The servers 102 and 104 can also be in communication via additional redundant communication paths, such as bidirectional link 138 that includes optical fiber links 152 and 154. Communication between the serves 102 and 104 may be a multiplexed synchronous time protocol, such as STP over WDM.

At block 304, a chromatic dispersion compensator is coupled to one of the optical fiber links 148 and 150 of the bidirectional computer data communication link 136, such as chromatic dispersion compensator 172. Chromatic dispersion compensation can be applied to either or both of the optical fiber links 148 and 150. As depicted in FIG. 2, the chromatic dispersion compensator 172 may include compensating optical fiber 205 having compensating optical fiber core 210 with chirped fiber Bragg grating 206 including wavelength gratings 212-216 (refractive index perturbations) spaced at distances varying with respect to the length 226 of the compensating optical fiber core 210. The chromatic dispersion compensator 172 also includes optical junction 208 to optically couple the chirped fiber Bragg grating 206 to the optical fiber link 148.

At block 306, the chromatic dispersion compensator 172 reduces chromatic dispersion of optical pulse (e.g., input pulse 202) received from the bidirectional computer data communication link 136 via reflecting longer wavelengths of the optical pulse through an optically shorter path (e.g., $\lambda_1$ through optically shorter path 218) of the chirped fiber Bragg grating 206 and reflecting shorter wavelengths of the optical pulse through an optically longer path (e.g., $\lambda_2$ through optically longer path 220) of the chirped fiber Bragg grating 206.

A bidirectional link may contain multiple chromatic dispersion compensators, which can vary in design characteristics. For example, chromatic dispersion compensators 172, 174, and 176 of FIG. 1 can use different types of optical junctions 208, have different lengths 226 of the compensating optical fiber core 210, and/or different degrees of chromatic dispersion compensation. However, the net effect of inserting the chromatic dispersion compensators 172, 174, and 176 into communication paths between the servers 102 and 104 is increased throughput at longer distances than could otherwise be achieved, while minimizing the differential latency impact between each direction of the bidirectional computer data communication links 136 and 138.

In an exemplary embodiment, the chromatic dispersion compensators 172, 174, and 176 are insensitive to ambient temperature changes. If the compensating optical fiber 205 is uniformly heated or stretched, the period of the chirped fiber Bragg grating 206 is changed, and accordingly the Bragg reflection wavelength is also changed, but the dispersion remains unchanged.

Technical effects include providing a low differential delay chromatic dispersion compensator for latency-sensitive networks. The use of a chirped fiber Bragg grating compensates for chromatic dispersion that can occur when transmitting multiple wavelengths and/or frequencies over long distances. The small length of compensating optical fiber added to the path length, in conjunction with no feedback loop delays, enables time-sensitive communications to stay synchronized between two or more servers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A chromatic dispersion compensator with low differential delay comprising:
    a chirped fiber Bragg grating in a compensating optical fiber core, the chirped fiber Bragg grating comprised of wavelength gratings spaced at distances varying with respect to the length of the compensating optical fiber core to compensate for differential delay in a synchronous time protocol for a bidirectional computer data communication link; and
    an optical junction to optically couple the chirped fiber Bragg grating to an optical fiber of the bidirectional computer data communication link, wherein the chirped fiber Bragg grating reduces chromatic dispersion of an optical pulse received at the chromatic dispersion compensator from the optical fiber coupled to the optical junction via reflecting longer wavelengths of the optical pulse through an optically shorter path of the chirped fiber Bragg grating and reflecting shorter wavelengths of the optical pulse through an optically longer path of the chirped fiber Bragg grating, and further wherein the optical pulse includes synchronous time protocol data in the shorter wavelengths and in the longer wavelengths, and the synchronous time protocol is a server time protocol that embeds time stamps in data streams between servers in communication via the optical fiber coupled to the optical junction.

2. The chromatic dispersion compensator of claim 1 wherein the chromatic dispersion compensator is optically passive.

3. The chromatic dispersion compensator of claim 1 wherein the optical fiber supports communication in one direction as part of the bidirectional computer data communication link between the servers, and the optical junction is one of: an optical splitter, tap, and circulator.

4. The chromatic dispersion compensator of claim 3 wherein differential latency in the bidirectional computer data communication link between the optical fiber and a second optical fiber supporting communication in an opposite direction is less than 15 nanoseconds.

5. The chromatic dispersion compensator of claim 1 wherein the length of the compensating optical fiber core is less than or equal to 3 meters.

6. The chromatic dispersion compensator of claim 1 wherein the diameter of the compensating optical fiber core is equivalent to the core diameter of the optical fiber within a manufacturing tolerance.

7. A system comprising:
    an optical fiber in a bidirectional computer data communication link to support optical communication between servers; and
    a chromatic dispersion compensator coupled to the optical fiber, the chromatic dispersion compensator having a low differential delay, comprising:
    a chirped fiber Bragg grating in a compensating optical fiber core, the chirped fiber Bragg grating comprised of wavelength gratings spaced at distances varying with respect to the length of the compensating optical fiber core to compensate for differential delay in a synchronous time protocol for a bidirectional computer data communication link; and an optical junction optically coupling the chirped fiber Bragg grating to the optical fiber in the bidirectional computer data communication link, wherein the chirped fiber Bragg grating reduces chromatic dispersion of an optical pulse received at the chromatic dispersion compensator from the optical fiber coupled to the optical junction via reflecting longer wavelengths of the optical pulse through an optically shorter path of the chirped fiber Bragg grating and reflecting shorter wavelengths of the optical pulse through an optically longer path of the chirped fiber Bragg grating, and further wherein the optical pulse includes synchronous time protocol data in the shorter wavelengths and in the longer wavelengths, and the synchronous time protocol is a server time protocol that embeds time stamps in data streams between the servers.

8. The system of claim 7 further comprising:
a multiplexing module coupled to the optical fiber, the multiplexing module switching the synchronous time protocol on the optical fiber transmitted by one of the servers.

9. The system of claim 8 wherein the multiplexing module performs one of: wave division multiplexing and time division multiplexing, and the optical junction is one of: an optical splitter, tap, and circulator.

10. The system of claim 7 wherein differential latency in the bidirectional computer data communication link between the optical fiber and a second optical fiber supporting communication in an opposite direction is less than 15 nanoseconds.

11. A method comprising:
linking at least two servers via a bidirectional computer data communication link comprised of optical fibers;
coupling a chromatic dispersion compensator with low differential delay to one of the optical fibers of the bidirectional computer data communication link, the chromatic dispersion compensator comprising:

a compensating optical fiber core with a chirped fiber Bragg grating spaced at distances varying with respect to the length of the compensating optical fiber core to compensate for differential delay in a synchronous time protocol for the bidirectional computer data communication link; and an optical junction to optically couple the chirped fiber Bragg grating to the optical fiber of the bidirectional computer data communication link; and reducing chromatic dispersion of an optical pulse received at the chromatic dispersion compensator from the bidirectional computer data communication link via reflecting longer wavelengths of the optical pulse through an optically shorter path of the chirped fiber Bragg grating and reflecting shorter wavelengths of the optical pulse through an optically longer path of the chirped fiber Bragg grating, wherein the optical pulse includes synchronous time protocol data in the shorter wavelengths and in the longer wavelengths, and the synchronous time protocol is a server time protocol that embeds time stamps in data streams between the at least two servers.

12. The method of claim 11 wherein the chromatic dispersion compensator is optically passive.

13. The method of claim 11 wherein the optical pulse includes synchronous time protocol data in the shorter wavelengths and in the longer wavelengths.

14. The method of claim 11 wherein differential latency in the bidirectional computer data communication link between the optical fiber and a second optical fiber supporting communication in an opposite direction is less than 15 nanoseconds.

15. The method of claim 11 wherein the length of the compensating optical fiber core is less than or equal to 3 meters.

16. The method of claim 11 wherein the diameter of the compensating optical fiber core is equivalent to the core diameter of the optical fiber within a manufacturing tolerance.

* * * * *